UNITED STATES PATENT OFFICE.

BYRON M. PICKETT, OF NEW YORK, N. Y., ASSIGNOR TO THE NEW PROCESS STEEL HARDENING COMPANY, OF PORTLAND, MAINE.

COMPOSITION OF FLUIDS FOR TEMPERING STEEL.

SPECIFICATION forming part of Letters Patent No. 437,795, dated October 7, 1890.

Application filed March 3, 1890. Serial No. 342,443. (No specimens.)

*To all whom it may concern:*

Be it known that I, BYRON M. PICKETT, of the city and State of New York, have invented certain Improvements in Composition of Fluids for Tempering Steel, of which the following is a specification.

This invention relates to a modification in the class of tempering-fluids composed of a diluent—such as oil or water—and a base composed, essentially, of an oxide or a carbonate, or of both an oxide and a carbonate, of iron or other metal of the so-called "iron group"— such as manganese, cobalt, or nickel—and containing a combustible organic substance which is soluble in water—such as glucose or its equivalent—the base being prepared by mixing its ingredients together, either cold or more or less hot, as described in pending application, No. 342,442, for a patent for the same class of tempering-fluids, filed March 3, 1890.

The present improvement consists in the addition to the base of a small quantity of sulphuric, nitric, muriatic, or other acid, in the proportion, say, of ten drops of acid for each ounce of the base, which causes the base to remain perceptibly acid in taste. The base is used either with a diluent of oil or water in the proportion of an ounce of the metallic ingredient to two gallons of the diluent.

In practice with the class of tempering-fluids referred to, the steel to be hardened is usually heated until it presents a dull-red appearance in a moderately dark place, and is then plunged at once into the tempering-fluid.

The described addition of acid to the base sensibly increases the effectiveness of the tempering-fluid for hardening steel without making it excessively brittle.

What is claimed as the invention is—

1. A tempering-fluid for treating steel, consisting of a diluent and a base composed, essentially, of an oxide or a carbonate, or of both an oxide and a carbonate, of a metal of the iron group, a small quantity of acid, and a combustible organic substance which is soluble in water, such as glucose, substantially as set forth.

2. The process of treating steel by heating it to a red heat and plunging it into a bath consisting of a diluent and a base composed, essentially, of an oxide or a carbonate, or of both an oxide and a carbonate, of a metal of the iron group, a small quantity of acid, and a combustible organic substance which is soluble in water, such as glucose, substantially as set forth.

BYRON M. PICKETT.

Witnesses:
EDMUND TWEELY,
WM. E. QUIMBY.